United States Patent [19]

Renaud

[11] Patent Number: 4,529,076
[45] Date of Patent: Jul. 16, 1985

[54] PULL-TYPE CLUTCH RELEASE BEARING

[75] Inventor: Pierre Renaud, Le Plessis-Trevise, France

[73] Assignee: Valeo, Paris, France

[21] Appl. No.: 401,332

[22] Filed: Jul. 23, 1982

[30] Foreign Application Priority Data

Jul. 30, 1981 [FR] France .............................. 81 14827

[51] Int. Cl.³ ............................................ F16D 23/14
[52] U.S. Cl. .................................... 192/98; 192/110 B
[58] Field of Search ..................... 192/98, 110 B, 99 S; 308/233

[56] References Cited

U.S. PATENT DOCUMENTS

| | | | |
|---|---|---|---|
| 3,985,215 | 10/1976 | Ernst et al. | 192/110 B X |
| 4,029,186 | 6/1977 | De Gennes | 308/233 X |
| 4,186,828 | 2/1980 | Renaud | 192/98 |
| 4,228,881 | 10/1980 | Nakamura | 308/233 X |
| 4,351,427 | 9/1982 | Miyahara | 308/233 X |
| 4,357,058 | 11/1982 | Sonnerat | 308/233 |

FOREIGN PATENT DOCUMENTS

| | | | |
|---|---|---|---|
| 2125871 | 9/1972 | France . | |
| 2255502 | 7/1975 | France . | |
| 2304828 | 10/1976 | France | 192/98 |
| 0047156 | 4/1977 | Japan | 192/110 B |
| 0121350 | 9/1979 | Japan | 192/98 |
| 0135234 | 10/1980 | Japan | 192/98 |
| 1565861 | 4/1980 | United Kingdom | 192/110 B |
| 2045380 | 10/1980 | United Kingdom | 192/98 |
| 2045381 | 10/1980 | United Kingdom | 192/98 |
| 2052001 | 1/1981 | United Kingdom | 192/98 |
| 2062798 | 5/1981 | United Kingdom | 192/98 |
| 8001595 | 8/1980 | PCT Int'l Appl. | 192/110 B |

Primary Examiner—Rodney H. Bonck
Assistant Examiner—David D. Rouse
Attorney, Agent, or Firm—Charles A. Brown; Charles E. Brown

[57] ABSTRACT

A pull-type clutch release bearing comprises a drive member acting in traction on an associated clutch release mechanism and an operating member having a sleeve with a transverse flange against which the drive member is adapted to bear. A so-called bearing member has a tubular portion and a radially inwardly directed collar at the end thereof remote from the flange for cooperation with the actuating member. The tubular portion may also have the usual radially outwardly directed collar at the end adjacent the flange for cooperation therewith. In an embodiment an extension on the bearing member for attaching the drive member to the operating member protrudes axially beyond the flange and a detent cooperates with a retaining notch between the flange and the bearing member to define a unitary subassembly between the bearing member and the operating member and/or relieve pressure on an axially acting spring in a self-centering arrangement during clutch disengagement.

19 Claims, 9 Drawing Figures

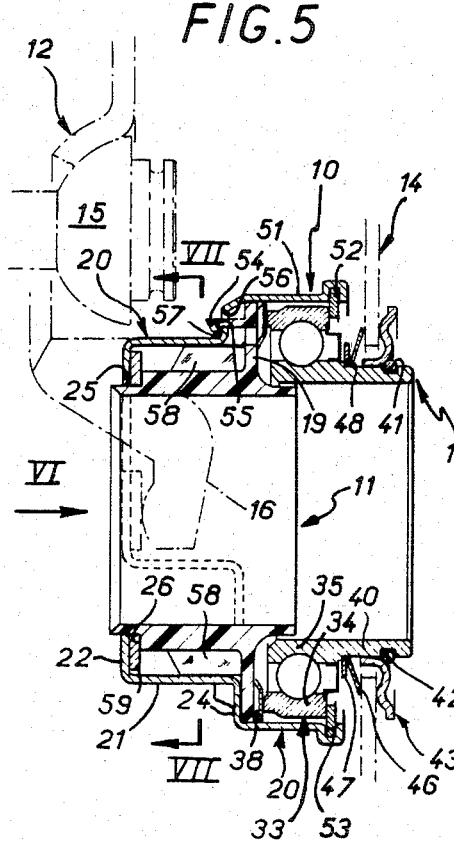
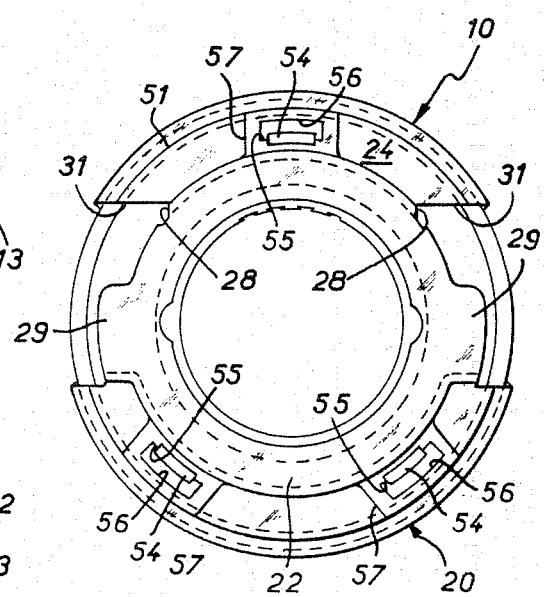
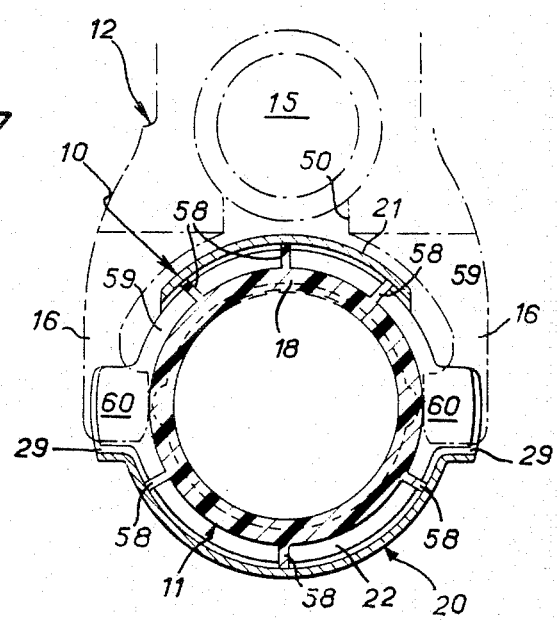

PULL-TYPE CLUTCH RELEASE BEARING

BACKGROUND OF THE INVENTION

The present invention relates generally to clutch release bearings for motor vehicles.

As is known a clutch release bearing which is adapted to control the release mechanism of a clutch generally comprises a drive or thrust member which is adapted to engage the clutch release mechanism and an operating member which is controlled directly or indirectly by an acutating member usually called a fork or fork actuator, the drive motor being axially attached to the operating member.

The present invention relates more particularly to such clutch release bearings which are adapted to operate in traction, in other words which are pulled. To this end the operating member comprises a sleeve having a transverse flange fixed thereto against which the drive member bears axially, and a so-called bearing member having an axial tubular portion and a radial collar cooperable with the axially moving fork actuating member bearing member remote from the flange.

In actual practice with release bearings of this type, the sleeve and the flange of the operating member are of one-piece molded plastic construction, and therefore to provide sufficient hardness or wear resistance for cooperation with the actuating member the bearing member is made of metal. Likewise, in practice, to protect the flange which is also made of plastic from the actuating member the bearing member comprises a second collar disposed at the end of said tubular portion adjacent the flange, the second collar overlying the surface of the flange.

Thus the bearing members used in pull or traction type release bearings usually have two radial collars parallel to each other, one in contact with the plastic flange for protecting the same and the other spaced from the flange for axial cooperation with the actuating member.

Heretofore the tubular portion of the bearing member with the two collars overlaid the plastic sleeve and was in intimate contact therewith, whereby the collars extend radially in the same direction, i.e., radially outwardly.

The fabrication of such a metal bearing member from a sheet of metal in a press is difficult. The formation of the two radially outwardly extending collars requires two swaging operations carried out in opposite directions necessitating complex and expensive tooling with relatively low production rates.

OBJECT AND SUMMARY OF THE INVENTION

The main object of the invention is the provision of a clutch release bearing which overcomes this shortcoming.

According to the invention there is provided a pull-type clutch release bearing for a motor vehicle, comprising an operating member controlled by an actuating member, and a drive member cooperable with a clutch release mechanism, the drive member being axially connected to the operating member. The operating member includes a sleeve having a transverse flange fixed thereto, the transverse flange defining an axial support for the drive member. The release bearing also comprises a bearing member having an axially extending tubular portion and a radial collar at the end of the tubular portion remote from the flange against which the actuating member is adapted to bear. The release bearing according to the invention is characterized by the collar on the bearing member extending radially inwardly.

Thus, according to the invention, and contrary to the usual arrangements known to date, the collar on the bearing member against which the actuating member bears does not extend away from the axis but toward the axis. Accordingly, if as is customarily the case, the bearing member also comprises a second collar at the end of the tubular portion adjacent the flange of the operating member of which it forms a part, the two collars may radially extend in opposed directions relative to each other, the second collar normally extending radially outwardly, away from the axis of the release bearing.

The fabrication of such a bearing member is thus facilitated and its cost is therefore reduced.

In practice, for the actuating member to have access to the radially inwardly directed collar on the bearing member, the tubular portion of the operating member is radially spaced from the sleeve of the operating member and has an opening for receiving the actuating member. In practice, since the actuating member has two arms for engagement with the collar, two openings at diametrically opposite positions relative to each other, are provided for receiving the arms of the actuating member.

In assembly it therefore suffices in order to couple the actuating member with the release bearing to radially engage the free ends of the arms of the actuating member into the openings provided in the tubular portion of the bearing member. The invention therefore has added utility in combination with the actuating member to which it is coupled by mere radial engagement.

According to a further feature of the invention the bearing member comprises an extension for axially attaching the drive member to the operating member, and therefore it advantageously forms the cap usually employed for ensuring attachment of the drive member to the operating member. Thus, the total number of parts is advantageously reduced.

For example, according to a preferred embodiment, the extension which the bearing member comprises is axially connected, e.g. by crimping, to a washer against which the drive member bears axially through a transverse shoulder, and detent means are provided between the bearing member and the flange of the operating member.

In the case of a permanently maintained self-centering release bearing, axially acting resilient means are provided between the drive member and the operating member, the resilient means are advantageously relieved, during clutch disengagement, of the corresponding axial force which is transmitted directly to the detent means without compressing the resilient means which would be detrimental to their service life and operational characteristics.

Furthermore, if desired, it is advantageously possible, during assembly of the release bearing, to form a subassembly of the bearing member and the operating member which facilitates the actual assembly operation.

According to another aspect of the invention there is provided a release bearing for a motor vehicle, comprising an operating member controlled by an actuating member, and a drive member cooperable with a clutch release member. The drive member is axially attached to the operating member. The operating member includes a sleeve having a transverse flange fixed thereto, the transverse flange defining an axial support for the drive member. The release bearing also comprises a so-called bearing member having an axially extending tubular portion and a first radial collar at the end of the tubular portion remote from the flange against which the actuating member is adapted to bear, and a second collar at the end of the tubular portion adjacent the flange for bearing thereagainst, the bearing member further comprising an axial extension attaching the drive member to the operating member. The release bearing is characterized by detent means operably disposed between the bearing member and the flange of the operating member.

In any event, if desired, the collar on the bearing member for cooperation with the actuating member may have an overlying reinforcement washer which is suitably surface treated thereby advantageously avoiding comparable surface treatment of the entire bearing member.

The features and advantages of the invention will be further brought out in the description which follows, given by way of example, with reference to the accompanying diagrammatic drawings.

BRIEF DESCRIPTION OF THE DRAWINGS

FIGS. 5-8 are views similar to the view of FIGS. 1-4 for an alternative embodiment.

DESCRIPTION OF THE PREFERRED EMBODIMENTS

Figure 1:
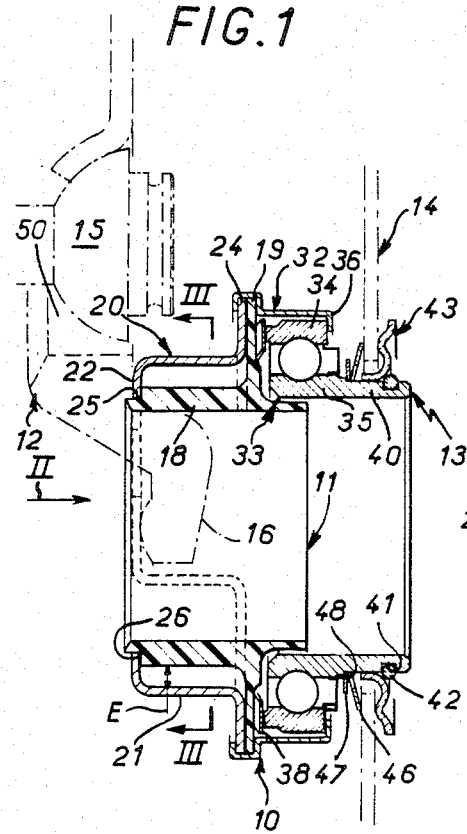
FIG. 1 is a longitudinal sectional view of a clutch release bearing embodying the invention.
Figure 2:
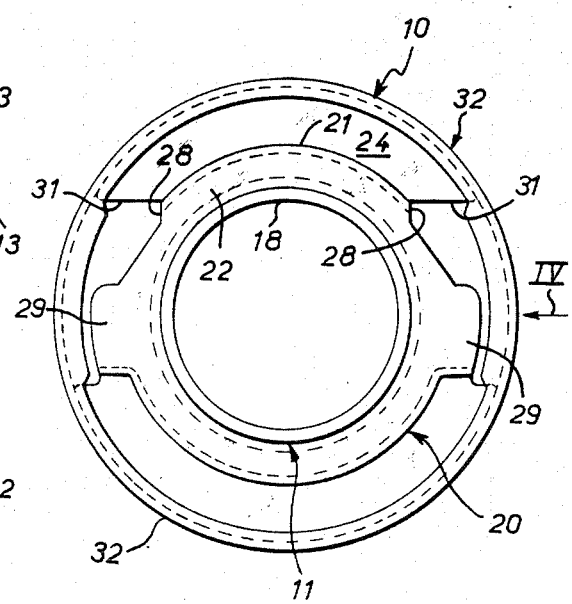
FIG. 2 is an end view of the clutch release bearing taken in the direction of arrow II in FIG. 1.

As shown in the drawings the clutch release bearing according to the invention generally comprises an operating member 11 controlled by an actuating member 12, and a drive member 13 cooperable with the release mechanism 14 of a clutch.

Figure 3:
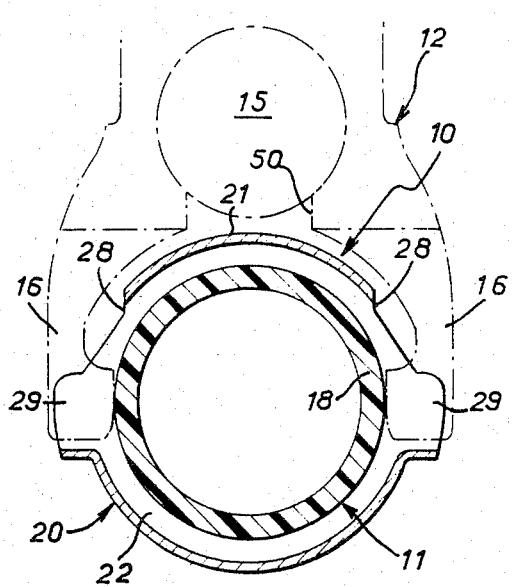
FIG. 3 is a cross-sectional view taken along the line III—III in FIG. 1.
Figure 4:
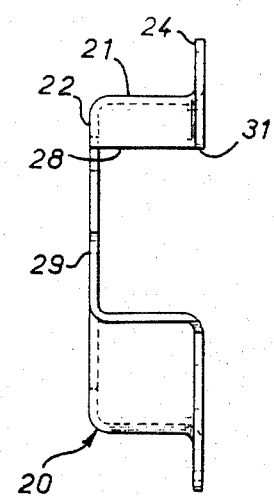
FIG. 4 is a side view taken in the direction of arrow IV in FIG. 2, of the bearing member shown on its own.

The actuating member 12 is only partly illustrated, in phantom lines, in FIGS. 1 and 3. In practice the actuating member is a fork actuator pivotally mounted on a ball member 15, and having two parallel arms 16 for engagement with the clutch release bearing 10.

Similarly, the clutch release mechanism 14 is only partly shown, in phantom lines, in FIG. 1. The clutch release mechanism may, for example, comprise the radial fingers of a diaphragm spring.

The operating member 11 comprises a sleeve 18 having an integral transverse annular flange 19 proximate to its end remote from the actuating member 12 against which the drive member 13 is adapted to bear. The operating member 11 further comprises a so-called bearing member having an axial tubular portion 21 and a radially extending collar 22 disposed at the end of the tubular portion 21 remote from the flange 19 and cooperable with the actuating member 12 in response to the axial action of the latter.

In practice the sleeve 18 and the flange 19 are of one-piece construction and the entire component which they comprise is of molded plastic construction. In practice the bearing member 20 is made of metal.

In the illustrated embodiments the bearing member 20 comprises a second collar 24 disposed at the end of the tubular portion 21 adjacent the flange 19 to bear against the latter.

According to a feature of the invention the collar 22 on the bearing member 20 which cooperates with the actuating member 12 extends radially inwardly from the tubular portion 21 with which it is integral. In conjunction therewith, as is conventional, the other collar 24 on the bearing member 20 extends radially outwardly. Thus, the collars 22 and 24 on the bearing member 20 extend in radially opposite directions relative to each other.

In practice the collar 22 on the bearing member 20 is in engagement with a reduced diameter bearing surface 25 on the sleeve 18 and against a transverse shouldeer 26 axially delimiting the bearing surface 25, and the other collar 24 is in engagement with the flange 19.

Further, as shown, the tubular portion 21 of the bearing member 20 is radially outwardly spaced from the sleeve 18 defining an annular space E between the sleeve 18 and the tubular portion 21.

The tubular portion 21 of the bearing member 20 also has an opening 28 for radial engagement of the actuating member 12 with the bearing member 20. In the illustrated embodiments two openings 28 are provided in diametrically opposite positions for radial engagement of the arms 16 of the actuating member 12. In each of the zones of the openings 28 in the tubular member 21, the collar 22 has a radial extension or lug 29 for cooperation with the corresponding axially movable arm 16 of the actuating member 12. In conjunction therewith, for reducing the axial dimension of the release bearing, the collar 24 on the bearing member 20 has a cutout 31 in axial alignment with the openings 28 in the tubular portion 21 so that the openings extend continuously through the cutouts along collar 24.

In the FIGS. 1-4 embodiment, the collar 24 of the bearing member 20 is held against the flange 19 by an annular cap 32 which also axially attaches the drive member 13 to the operating member 11.

As is known per se, the drive member 13 comprises a ball bearing 33. The outer race 34 of the ball bearing 33 bears axially against the flange 19 of the operating member 11 as will be described below. On the other hand the inner race 35 is axially spaced from the flange 19.

In the illustrated embodiment one of the ends of the cap 32 is annularly crimped over the combination of the flange 19 and the collar 24 and the other end of the cap 32 has a radially inwardly projecting right-angle rim 36 against which bears the drive member 13. Thus, in practice, the drive member 13 bears against the flange 19 through the intermediary of the cap 32.

In the case of a self-centering clutch release bearing annular clearance in all directions is left radially between the sleeve 18 of the operating member 11 and the cap 32 to permit transverse movement of the drive member 13 to achieve self-centering. In other words, within the annular clearance determined by the sleeve 18 and the cap 32, the drive member 13 may be displaced transversely in any direction with the outer race 34 in contact with the rim 36. Also, since the release bearing is self-centering, axially acting resilient means is provided between the drive member 13 and the operating member 11. The resilient means in the preferred embodiment is an undulated or corrugated spring washer 38 of the type sold under the trade name Onduflex. The undulated or corrugated spring washer 38 is axially interposed between the outer race 34 of the ball bearing 13 and the flange 19 of the operating member. Alternatively, the spring washer 38 may be interposed between the outer race 34 and the rim 36 of the cap 32.

Since the release bearing is of the pull- or traction-type, in other words, a clutch release bearing which applies traction or pulling force on the release mechanism 14 to disengage the clutch, the drive member 13 is adapted to bear on the surface of the clutch release mechanism 14 facing away from the clutch actuating member.

As shown, the inner race 35 of the ball bearing 33 comprises an axial extention 40 received in the central opening of the clutch release mechanism 14 and having a groove 41 for receiving a split washer 42 for urging a radially ondulated washer 43 which bears axially by its undulation against the clutch release mechanism 14 on the side thereof remote from the cluch actuating member 12. On the side of the clutch release mechanism facing the actuating member 12, a spring washer 46, through a force distributing washer 47, is supported against a transverse shoulder 48 on the axial extension 40 of the inner race 35 of the ball bearing 33 and bears axially against the clutch release mechanism 14.

Thus, the clutch release mechanism 14 is clipped or clamped between the washer 46 and the washer 43.

During assembly there is relative axial displacement of the engine block carrying the clutch of which the clutch release mechanism 14 is a part, and the associated gearbox toward each other. After this relative axial displacement the fork actuating member 12 is brought into position by radial engagement with its ball member 15; for this reason the actuating member has a cutout 50 at the base of the arms and therebetween. During this radial engagement the arms 16 of the actuating member enter the tubular portion 21 of the bearing member 20 through openings 28 therein. The free ends of the arms 16 are thus received behind the radial extensions or lugs 29 on the collar 22 of the bearing member 20 for cooperation with the side of the radial extensions or lugs 29 facing the clutch release mechanism 14.

In the alternative embodiment of FIGS. 5-7, the bearing member 20 has an axial extension forming a cap by which the drive member 13 is attached to the operating member 11.

The cap extension 51 has a diameter greater than that of the tubular portion 21 of the bearing member 20 and it radially surrounds the flange 19 and extends axially therebeyond to be axially joined to a washer 52 against which the outer race 34 of the ball bearing 33 bears, the drive element 13 thus bearing axially against the extension 51.

Figure 8:
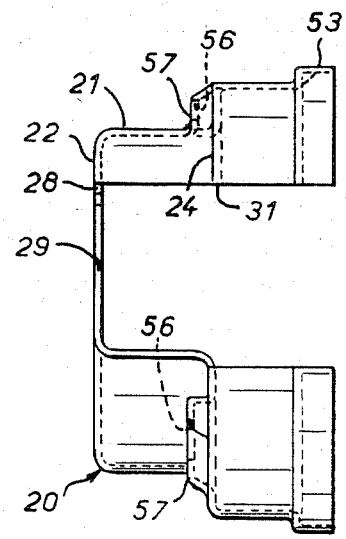
Figure 9:
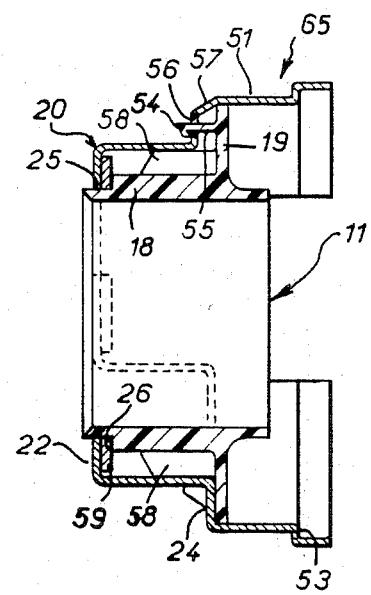
FIG. 9, similar to FIG. 5, is a longitudinal sectional view of a unitary subassembly of the clutch release bearing for the embodiment of FIGS. 5-8.

In the illustrated embodiment the extension 51 of the bearing member 20 is axially joined to the washer 52 by crimping. To this end the extension 51 has a transverse shoulder 53 against which the washer 52 is axially supported, and therebeyond, its extremity, which is purposely shown straight in FIGS. 8 and 9, is radially inwardly bent over into contact with the washer.

Furthermore, in this embodiment detent means are provided between the bearing member 20 and the flange 19. Peferably, the detent means comprise at least one elastically deformable detent axially projecting from the flange 19 and a cooperable retaining notch 55 formed on the bearing member 20. In the illustrated embodiment the retaining notch 55 comprises an edge finishing an opening 56 for receiving the detent 54 formed in the transverse wall in an axially projecting boss extending away from the flange, in the collar 24 through which the bearing member bears against the flange 19.

In actual practice three such detents 54 are provided, and angularly spaced along the flange 19 and in registration therewith three bosses 57 project axially from the collar 24 away from the flange 19.

In any event by providing direct bearing contact between the bearing member 20 and the flange 19 of the operating member 11 during clutch disengagement, the detent means relieves the spring washer 38 by preventing additional compression thereof during clutch disengagement.

Furthermore, owing to the detent means, the bearing member 20, the sleeve 18 and the flange of the operating member 11 may advantageously comprise a unitary subassembly for facilitating assembly of the clutch release bearing. Such a unitary subassembly is shown on its own in FIG. 9 and designated by general reference numeral 65.

Moreover, in the embodiment of FIGS. 5-7, radial ribs 58 are provided projecting from the outer surface of the sleeve 18 of the operating member 11 for supporting the tubular portion 21 of the bearing member 20. Radial ribs 58 extend axially from the flange 19 only along part of the axial length of the sleeve 18.

Also, in the embodiment of FIGS. 5-7, the collar 22 of the bearing member 20 which is the one cooperating with the actuating member 12 has an overlying reinforcement washer 59 for this purpose.

Owing to this arrangement only the reinforcement washer 59 clamped axially between collar 22 of the bearing member and the corresponding transverse shoulder 26 of the sleeve 18 need be surface treated to be able to withstand cooperation with the actuating member 12. In this case the bearing member 20 may advantageously not undergo any treatment of this king.

In practice the washer 59 has radial projections 60 which extend respectively along the radial extensions or lugs 29 on the collar 22 of the bearing member.

The present invention is of course not limited to the illustrated and described embodiments but encompasses all alternatives and modifications understood to those skilled in the art without departing from the scope of the invention.

In particular, as regards the embodiment of FIGS. 1-4, although the invention is particularly suited for the case in which the bearing member bears axially through its collar against the flange of the operating member this is not necessarily so. On the contrary, the bearing member may be devoid of such a collar, and other means may be utilized for the axial attachment with the flange or more generally the operating member.

Finally, the field of the invention is not limited to self-centering clutch release bearings which retain their centered position, nor even self-centering release bearings in general, but includes all types of clutch release bearings irrespective of their ability to self-center.

What is claimed is:

1. A pull-type clutch release bearing for a motor vehicle, said clutch release bearing comprising an operating member controlled by an actuating member and a drive member cooperable with a clutch release mechanism for pull-type release, said drive member being axially attached to said operating member, said operating member including a sleeve having a transverse flange fixed thereto, the transverse flange defining an axial support for said drive member; and a bearing member having an axially extending tubular portion and having a radially inwardly extending collar positioned at the end of said tubular portion remote from said flange, said radially inwardly extending collar having a surface facing axially toward said flange and being engageable with the actuating member for pulling the release bearing away from the clutch release mechanism to effect clutch disengagement.

2. The clutch release bearing of claim 1, wherein said tubular portion of said bearing member is radially outwardly spaced from said sleeve.

3. The clutch release bearing of claim 2, wherein said tubular portion comprises at least one opening for radial engagement of said actuating member.

4. The clutch release bearing of claim 2, wherein circumferentially spaced radial ribs are provided on said sleeve between said sleeve and said bearing member tubular portion.

5. The clutch release bearing of claim 1, wherein detent means are operatively disposed between said bearing member and said flange on said operating member for releasably securing said bearing member on the flange of said operating member.

6. The clutch release bearing of claim 1, wherein said drive member is disposed on the side of said flange facing away from said surface on said bearing member.

7. A clutch release bearing for a motor vehicle, said clutch release bearing comprising an operating member controlled by an actuating member; a drive member co-operable with a clutch release mechanism, said drive member being axially attached to said operating member, said operating member including a sleeve having a transverse flange fixed thereto, said transverse flange defining an axial support for said drive member; and a bearing member having an axially extending tubular portion and a first collar for engagement with the actuating member, and a second collar at the end of said tubular portion adjacant said flange, for bearing thereagainst, said bearing member having an axial extension for axially attaching said drive member to said operating member; and detent means operatively disposed beween said bearing member and said flange on said operating member for releasably securing said bearing member on the flange of said operating member.

8. The clutch release bearing of claim 7, wherein said detent means comprises at least one elastically deformable detent axially projecting from said flange and a cooperable retaining notch formed in said bearing member.

9. The clutch release bearing of claim 8, wherein said retaining notch is provided on a boss extending axially away from said flange.

10. A pull-type clutch release bearing for a motor vehicle, said clutch release bearing comprising an operating member controlled by an actuating member and a drive member cooperable with a clutch release mechanism, said drive member being axially attached to said operating member, said operating member including a sleeve having a transverse flange fixed thereto, the transverse flange defining an axial support for said drive member; and a bearing member having an axially extending tubular portion and having a radially inwardly extending collar positioned at the end of said tubular portion remote from said flange, said radially inwardly extending collar having a surface facing axially toward said flange and adapted to be engageable with the actuating member, wherein said bearing member comprises an extension for axially attaching said drive member to said operating member.

11. The clutch release bearing of claim 10, wherein said bearing member extension circumferentially surrounds said flange and extends axially therebeyond.

12. The clutch release bearing of claim 10 or claim 11, wherein said bearing member is joined axially to a washer against which said drive member bears axially.

13. A pull-type clutch release bearing for a motor vehicle, said clutch release bearing comprising an operating member controlled by an actuating member and a drive member cooperable with a clutch release mechanism, said drive member being axially attached to said operating member, said operating member including a sleeve having a transverse flange fixed thereto, the transverse flange defining an axial support for said drive member; and a bearing member having an axially extending tubular portion and having a radially inwardly extending collar positioned at the end of said tubular portion remote from said flange, said radially inwardly extending collar having a surface facing axially toward said flange and adapted to be engageable with the actuating member, detent means being operatively disposed between said bearing member and said flange on said operating member, wherein said bearing member comprises an extension for axially attaching said drive member to said operating member, said detent means comprising at least one elastically deformable detent axially projecting from said flange and a cooperable retaining notch defined in said bearing member.

14. The clutch release bearing of claim 13, wherein said retaining notch is formed in a boss on the second collar extending axially away from said flange.

15. A pull-type clutch release bearing for a motor vehicle, said clutch release bearing comprising an operating member controlled by an actuating member and a drive member cooperable with a clutch release mechanism, said drive member being axially attached to said operating member, said operating member including a sleeve having a transverse flange fixed thereto, the transverse flange defining an axial support for said drive member; and a bearing member having an axially extending tubular portion and having a radially inwardly extending collar positioned at the end of said tubular portion remote from said flange, said radially inwardly extending collar having a surface facing axially toward said flange and adapted to be engageable with the actuating member, and a second collar at the end of said tubular portion adjacent said flange for bearing against the latter, wherein said second collar extends radially outwardly, in the opposite direction to that of the first-mentioned collar.

16. A pull-type clutch release bearing for a motor vehicle, said clutch release bearing comprising an operating member controlled by an actuating member and a drive member cooperable with a clutch release mechanism, said drive member being axially attached to said operating member, said operating member including a sleeve having a transverse flange fixed thereto, the transverse flange defining an axial support for said drive member; and a bearing member having an axially extending tubular portion and having a radially inwardly extending collar positioned at the end of said tubular portion remote from said flange, said radially inwardly extending collar having a surface facing axially toward said flange and adapted to be engageable with the actuating member, said tubular portion of said bearing member being radially outwardly spaced from said sleeve, said tubular portion comprising at least one opening for radial engagement of said actuating member, and a second collar at the end of said tubular portion adjacent said flange for bearing against the latter, wherein said second collar extends radially outwardly, said opening in said tubular portion also including an axially aligned part of said second collar.

17. A pull-type clutch release bearing for a motor vehicle, said clutch release bearing comprising an operating member controlled by an actuating member and a drive member cooperable with a clutch release mechanism, said drive member being axially attached to said operating member, said operating member including a sleeve having a transverse flange fixed thereto, the transverse flange defining an axial support for said drive member; and a bearing member having an axially extending tubular portion and having a radially inwardly extending collar positioned at the end of said tubular portion remote from said flange, said radially inwardly extending collar having a surface facing axially toward said flange and adapted to be engageable with the actuating member, wherein radial extensions on said collar extend radially outwardly from said tubular portion to form continuations of said first mentioned surface so as to provide a bearing surface for the actuating member which extends both radially inwardly and outwardly of said bearing member tubular portion.

18. A pull-type clutch release bearing for a motor vehicle, said clutch release bearing comprising an operating member controlled by an actuating member and a drive member cooperable with a clutch release mechanism, said drive member being axially attached to said operating member, said operating member including a sleeve having a transverse flange fixed thereto, the transverse flange defining an axial support for said drive member; and a bearing member having an axially extending tubular portion and having a radially inwardly extending collar positioned at the end of said tubular portion remote from said flange, said radially inwardly extending collar having a surface facing axially toward said flange and adapted to be engageable with the actuating member, and said drive member being disposed on the side of said flange facing away from said surface on said member, wherein means are provided on said drive member for gripping a release member of a clutch, said means having an active engagement surface facing axially toward said surface on said bearing member.

19. A clutch release bearing for a motor vehicle, said clutch release bearing comprising an operating member controlled by an actuating member and a drive member cooperable with a clutch release mechanism, said drive member being axially attached to said operating member, said operating member including a sleeve having a transverse flange fixed thereto, the transverse flange defining an axial support for said drive member; and a bearing member having an axially extending tubular portion and a radially inwardly extending collar at the end of said tubular portion remote from said flange, circumferentially spaced radial ribs being provided on said sleeve between said sleeve and said bearing member tubular portion, and a second collar at the end of said tubular portion adjacent said flange for bearing against the latter, said collar extending radially outwardly, said tubular portion defining an opening, said opening of said tubular portion also including an axially aligned part of said second collar.

* * * * *